United States Patent
Brearley et al.

(10) Patent No.: US 8,321,255 B1
(45) Date of Patent: Nov. 27, 2012

(54) RESOURCE MANAGEMENT AND PLANNING IN A DISTRIBUTED MANUFACTURING ENVIRONMENT

(75) Inventors: Quentin Stewart Brearley, Rancho Palos Verdes, CA (US); Hajime Tamura, Fuchu (JP); Anil Kumar Sharma, Culver City, CA (US)

(73) Assignee: Glovia International, Inc., El Segundo, CA (US)

( * ) Notice: Subject to any disclaimer, the term of this patent is extended or adjusted under 35 U.S.C. 154(b) by 2988 days.

(21) Appl. No.: 10/996,705

(22) Filed: Nov. 22, 2004

Related U.S. Application Data (60) Provisional application No. 60/530,631, filed on Dec. 17, 2003.

(51) Int. Cl.
   *G06Q 10/00* (2006.01)
(52) U.S. Cl. ........... 705/7.22; 705/7.12; 700/28; 700/99
(58) Field of Classification Search ................. 705/7.22, 705/7.12; 700/28, 99
   See application file for complete search history.

(56) References Cited

U.S. PATENT DOCUMENTS

| | | | | |
|---|---|---|---|---|
| 4,888,692 | A * | 12/1989 | Gupta et al. | 700/96 |
| 5,630,070 | A * | 5/1997 | Dietrich et al. | 705/7.23 |
| 5,974,395 | A * | 10/1999 | Bellini et al. | 705/7.31 |
| 6,141,647 | A | 10/2000 | Meijer et al. | 705/1 |
| 6,157,915 | A * | 12/2000 | Bhaskaran et al. | 705/7 |
| 6,243,611 | B1 * | 6/2001 | Hazama et al. | 700/97 |
| 6,615,092 | B2 | 9/2003 | Bickley et al. | 700/99 |
| 6,629,008 | B2 | 9/2003 | Shiiba et al. | 700/100 |
| 6,915,275 | B2 | 7/2005 | Banerjee et al. | 705/26 |
| 6,934,594 | B2 | 8/2005 | Loring et al. | 700/100 |
| 7,031,929 | B1 * | 4/2006 | Button et al. | 705/7.22 |
| 7,043,320 | B1 * | 5/2006 | Roumeliotis et al. | 700/100 |
| 7,162,318 | B1 * | 1/2007 | Brearley et al. | 700/97 |
| 7,212,976 | B2 * | 5/2007 | Scheer | 705/1 |
| 7,313,534 | B2 * | 12/2007 | Scheer | 705/9 |
| 7,324,966 | B2 * | 1/2008 | Scheer | 705/28 |
| 7,739,121 | B2 * | 6/2010 | Jain et al. | 705/1.1 |
| 2002/0138358 | A1 * | 9/2002 | Scheer | 705/26 |
| 2002/0143598 | A1 * | 10/2002 | Scheer | 705/9 |
| 2002/0143669 | A1 * | 10/2002 | Scheer | 705/28 |
| 2002/0161674 | A1 * | 10/2002 | Scheer | 705/28 |
| 2003/0139952 | A1 * | 7/2003 | Lubash et al. | 705/7 |
| 2004/0117048 | A1 | 6/2004 | Wei | 700/100 |
| 2004/0117227 | A1 | 6/2004 | Wei | 705/7 |
| 2004/0148212 | A1 * | 7/2004 | Wu et al. | 705/8 |
| 2005/0096957 | A1 * | 5/2005 | Bayoumi et al. | 705/8 |

OTHER PUBLICATIONS

Chan, F., et al., "Modelling of Integrated, Distributed and Cooperative Process Planning System using an Agent-Based Approach," Proceedings of the Institution of Mechanical Engineers: Part B : Journal of Engineering Manufacture. London: 2001. vol. 215, Iss. 10; pp. 1437-1451.*

(Continued)

*Primary Examiner* — Andre Boyce
*Assistant Examiner* — Tiphany Dickerson
(74) *Attorney, Agent, or Firm* — Baker Botts L.L.P.

(57) ABSTRACT

A method for resource management and planning includes receiving manufacturing information associated with multiple distributed enterprise facilities; generating manufacturing plans based at least in part on the manufacturing information; receiving feedback regarding execution of the manufacturing plans; identifying at least one of the manufacturing plans describing manufacturing activities planned to occur within a fixed time period in the future; modifying the identified manufacturing plan based on the feedback; and communicating the modified manufacturing plan to the distributed enterprise facilities.

10 Claims, 4 Drawing Sheets

OTHER PUBLICATIONS

Vieira, G. et al., "Rescheduling Manufacturing Systems: A Framework of Strategies, Policies, and Methods" (Jan. 2003) Journal of Scheduling, vol. 6, Iss. 1, pp. 39-62.*

Wacker, J.G., Lummus, R.R., "Sales Forecasting for Strategic Resource Planning," International Journal of Operations & Production Management 22, 9/10 (2002) 1014-1031, 2002.

* cited by examiner

RESOURCE MANAGEMENT AND PLANNING IN A DISTRIBUTED MANUFACTURING ENVIRONMENT

RELATED APPLICATION

This application claims priority to U.S. Provisional Patent Application Ser. No. 60/530,631 filed Dec. 17, 2003, entitled Global Business Management.

TECHNICAL FIELD OF THE INVENTION

The present invention relates generally to resource management and planning, and, more particularly, to resource management and planning in a distributed manufacturing environment.

BACKGROUND OF THE INVENTION

Traditionally, planning the manufacture of a product occurs after a customer orders the product. A salesman may receive information regarding the customer's requirements, contact a product manager to generate a configured product solution, look up pricing in price lists, contact a sales manager to confirm discounts and terms, conduct a credit check, and contact a manufacturing representative to determine dates the product may be available. After gathering all this information, the salesman may contact the customer to seek approval of details of the order. Once the customer approves the order, a manufacturing department may plan and schedule production of the ordered product. Planning usually takes place periodically using batch processing.

SUMMARY OF THE INVENTION

In accordance with the present invention, techniques for managing manufacturing resources and planning manufacturing activities are provided. According to particular embodiments, these techniques enable the interoperability of enterprise resource planning (ERP) systems with collaboration and planning tools.

According to a particular embodiment, a method for resource management and planning includes receiving manufacturing information associated with multiple distributed enterprise facilities; generating manufacturing plans based at least in part on the manufacturing information; receiving feedback regarding execution of the manufacturing plans; identifying at least one of the manufacturing plans describing manufacturing activities planned to occur within a fixed time period in the future; modifying the identified manufacturing plan based on the feedback; and communicating the modified manufacturing plan to the distributed enterprise facilities.

Embodiments of the invention provide various technical advantages. For example, these techniques may eliminate or reduce difficulties associated with traditional methods of managing manufacturing resources and planning manufacturing activities. These techniques may support greater data visibility across an organization and its business partners, permit more effective and earlier planning, and increase the ability to control and optimize business activities. Communication between traditional ERP systems and external systems may be enabled, and traditional ERP functions may be extended beyond the borders of one enterprise. For example, information may be shared among enterprises to support sophisticated business planning. Effective and accurate planning for manufacturing tasks may be based on information received from suppliers, venders, and factories. Furthermore, automated tools may provide access to near real-time business information to permit planning based upon actual capabilities and conditions. Near real-time information may also provide useful feedback to identify delivery dates and optimize manufacturing schedules.

Other technical advantages of the present invention will be readily apparent to one skilled in the art from the following figures, descriptions, and claims. Moreover, while specific advantages have been enumerated, various embodiments may include all, some, or none of the enumerated advantages.

BRIEF DESCRIPTION OF THE DRAWINGS

For a more complete understanding of the present invention and its advantages, reference is made to the following description, taken in conjunction with the accompanying drawings, in which.

DETAILED DESCRIPTION OF THE INVENTION

Figure 1:
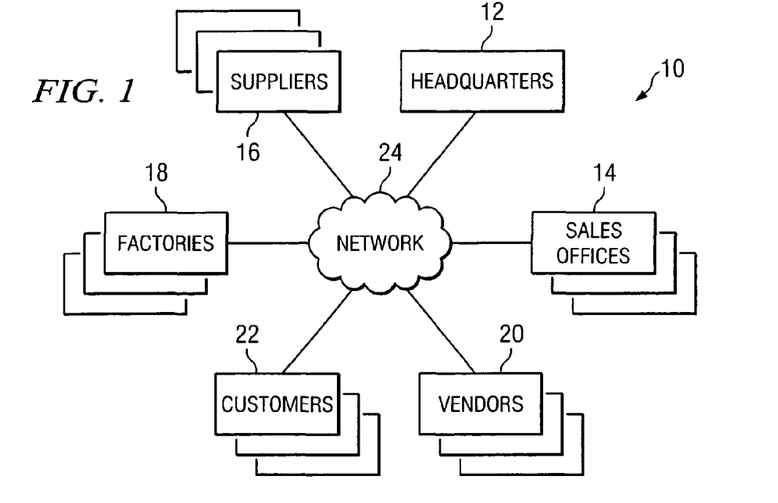
FIG. 1 illustrates a manufacturing system.

FIG. 1 illustrates a manufacturing system, indicated generally at 10, that includes a headquarters 12, sales offices 14, suppliers 16, factories 18, customers 22, and vendors 20 interconnected through a network 24. In general, headquarters 12 and/or sales offices 14 may use resource management and planning tools to generate production plans for use by elements within manufacturing system 10. In particular, headquarters 12 and/or sales offices 14 may respond to a request by customer 22 for manufacture of a product by using up-to-date information obtained from suppliers 16, factories 18, and vendors 20 to generate a production plan to affect resource management and manufacturing plans of suppliers 16, factories 18, and vendors 20. Furthermore, after commencement of production activities, up-to-date information shared between suppliers 16, factories 18, and vendors 20 may be used to optimize production plans.

Headquarters 12 and sales offices 14 represent centralized and distributed business offices for managing and planning aspects of manufacturing occurring within manufacturing system 10. Suppliers 16, factories 18, and vendors 20 represent entities involved in the manufacturing of products. Each may be a part of the same manufacturing enterprise or only affiliated with the enterprise. Furthermore, these elements may be distributed within a geographic region or across the world. Customers 22 represent entities requesting manufacturing and/or delivery of products manufactured within manufacturing system 10. Note that headquarters 12, sales offices 14, suppliers 16, factories 18, customers 22, and vendors 20 each include appropriate hardware, software, and controlling logic capable of communicating with other elements of manufacturing system 10 through network 24.

Note that, as used herein, "manufacturing" and "production" represent any activities that may occur to cause production and delivery of a product to a customer. Thus, for example, manufacturing and production may include any acts related to the acquisition of physical resources from suppliers, processing of physical resources to form a product, and delivery of products to customers.

Network 24 represents any suitable collection of hardware, software, and controlling logic capable of interconnecting elements coupled to network 24. In a particular embodiment, network 24 may include one or multiple networks, such as a telecommunications network, a local area network (LAN), a wide area network (WAN), the Internet, and/or any other appropriate networks. Thus, network 24 provides infrastructure to support communications within manufacturing system 10.

In operation, headquarters 12 and/or sales offices 14 may interact with other elements of manufacturing system 10 through network 24 to arrange for manufacture of products for customers 22 using resource management and planning tools. For example, in a particular embodiment, headquarters 12 and/or sales offices 14 may receive a purchase order from customer 22 through network 24 and/or generate a purchase order based on a request received from customer 22 through network 24. In response to receiving or generating the purchase order for a particular product, headquarters 12 and/or sales offices 14 may generate a bill of materials using the purchase order, and break down the bill of materials into an itemized list of materials and/or components to be manufactured, purchased, and/or assembled to produce the requested product. Headquarters 12 and/or sales offices 14 may utilize up-to-date information received from suppliers 16, factories 18, and/or vendors 20 through network 24 to determine an ability to produce a requested product. For example, costs and production dates associated with manufacture of a product may be estimated by using the up-to-date information. The costs and production dates may be used to generate one or more production plan. After a production plan is selected, headquarters 12 and/or sales offices 14 may generate sales orders, assembly instructions, work orders, or other appropriate communications to schedule production in accordance with the production plan. Furthermore, invoicing and other types of communications may be transmitted through network 24. A response to the purchase order may be communicated back to customer 22 acknowledging receipt of the purchase order and/or an ability to fulfill the purchase order along with details such as a delivery date.

To enable effective management of manufacturing resources and planning of manufacturing activities, relevant and up-to-date information may be shared among elements of manufacturing system 10. For example, at any point during production, information regarding changes in manufacturing system 10 may be communicated through network 24 for appropriate consideration. Records of past, present, and future manufacturing activities, inventories, sales, purchases, deliveries, and other relevant information may be stored by suppliers 16, factories 18, and vendors 20 using local enterprise resource planning (ERP) and other tools. The information may be used for specific purposes. For example, the information may be used to develop production plans before confirming an order for manufacture of a product.

Information may be gathered from various sources. For example, information from facilities that are part of the manufacturing enterprise may be accessed and utilized. According to particular embodiments, a common protocol may be used to share information among facilities within an enterprise. Furthermore, by utilizing collaboration tools, information stored by facilities that are only affiliated with the manufacturing enterprise may be accessed and utilized. The collaboration tools may allow information to be gathered despite the use of different protocols by affiliated enterprises.

According to a particular embodiment, a number of devices may be distributed among various elements of manufacturing system 10 to provide for sharing of information. For example, at each manufacturing facility that is part of the manufacturing enterprise, an advanced planning and scheduling (APS) module may track information related to materials, scheduling, and other manufacturing data. Each of the APS modules may couple tightly or loosely with local ERP systems at the manufacturing facilities. Through this interaction, the APS modules may extract relevant information stored at local facilities and push out data for use in planning and executing activities at centralized and other distributed facilities. For example, database triggers may initiate communication of information related to changes at a local ERP system from the local facility to a global ERP database. The global ERP database may therefore provide centralized storage for relevant and up-to-date data. Information stored in the global ERP database may be shared with a memory resident data module to provide for efficient and timely use of the information to generate production plans. For example, the memory resident data module may load relevant data into volatile memory for analysis upon request. Thus, transaction processing may be provided using the memory resident data module. To provide for effective transaction processing, the memory resident data module may be scaled to operate within a fixed memory space. According to particular embodiments, another set of database triggers may be used to communicate changes in information stored by the global ERP database to a memory resident data module. Thus, the memory resident data module, which may be used at a centralized or distributed facility such as headquarters 12 or sales offices 14, may be updated automatically when changes occur at local facilities, and near real-time information stored in the memory resident data module may be utilized to generate production plans based on near-real time information.

Headquarters 12 and/or sales offices 14 may utilize high level planning tools to analyze gathered information for multiple purposes. For example, high level planning tools may be used to generate production plans. Production plans may be automatically generated and/or generated in response to interaction with an individual. Various algorithms and rules may be utilized to determine or suggest one or more production plans. Also, various types of information may be considered, such as inventory, production capacity, sales, and previous production plans.

High level planning tools may generate production plans using gathered information as well as customer requirements. For example, the high level planning tools may indicate whether an order received from a customer 22 may be scheduled according to requirements indicated by customer 22. The requirements may be compared with inventory, production capacity, sales, previous production plans, and other gathered information. Moreover, the high level planning tools may be used to create an optimized plan for production of the requested product. For example, high level planning tools may be used to determine which of multiple factories is best able to meet production demands. Factors such as cost and time may be important, and information such as inventory and production capacities of various factories may be useful to allow an informed decision to be made.

According to a particular embodiment, a production sales and inventory (PSI) interface tool may enable decisions related to production plans to be made based on up-to-date information, including near real-time information. The PSI interface tool may provide an individual with a graphical interface to view information stored by a memory resident data module. The PSI interface tool may also allow an individual to view, generate, and test production plans and initiate communication of accepted production plans through network 24. Furthermore, the PSI interface tool may allow interaction with complex production rules and algorithms.

In addition, an intelligent order for management (IOM) tool may optimize and reoptimize resource management and planning. For example, the IOM tool may receive feedback from each of the APS modules located in factories within the manufacturing enterprise. Using this feedback, the IOM module may adjust plans generated by the PSI interface tool. According to particular embodiments, the IOM tool optimizes plans for assembly and delivery of products. Up until actual execution of plans and even after manufacture but before delivery, the IOM tool can adjust manufacturing and delivery plans based upon feedback from factories and other sources of information.

Thus, elements of manufacturing system 10 may share information to coordinate manufacturing of products. Centralized resource management and planning may eliminate inefficiencies created by duplicative and uncoordinated manufacturing efforts. In particular, global and local production plans may be generated based on up-to-date information. Furthermore, production plans may be optimized in response to relevant changes at manufacturing facilities.

Figure 2:
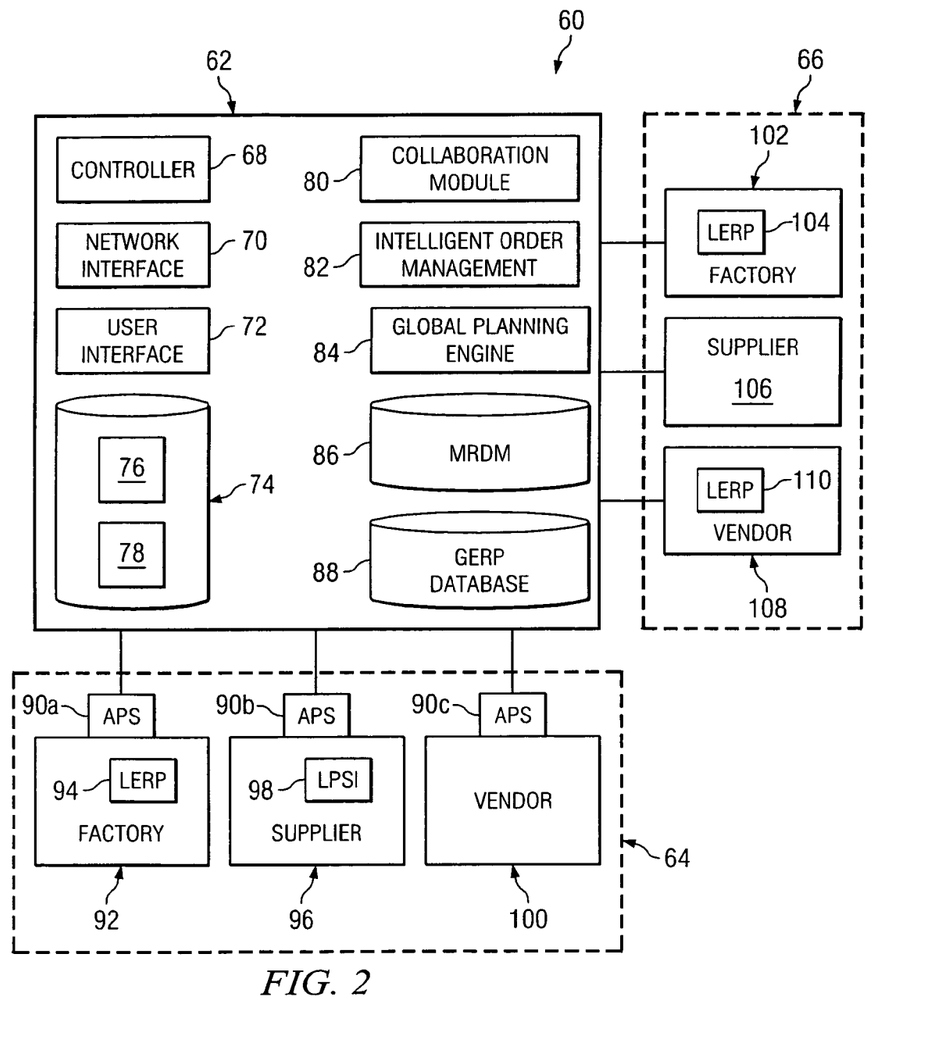
FIG. 2 illustrates functional components of a manufacturing system that manages manufacturing resources and plans manufacturing activities in accordance with the present invention.

FIG. 2 illustrates a manufacturing system, indicated generally at 60, that includes a resource management and planning system 62, enterprise elements 64, and affiliated elements 66. Elements of manufacturing system 60 operate to manage manufacturing resources and plan manufacturing activities. Note that while manufacturing system 60 includes various elements arranged in a particular manner and grouped into various subsystems, manufacturing system 60 shows only one embodiment and the elements may be otherwise grouped, subdivided, and/or combined as appropriate.

Resource management and planning system 62 includes a controller 68, network interface 70, user interface 72, memory 74, collaboration module 80, IOM module 82, global planning engine 84, memory resident data module 86, and global ERP database 88. Elements of resource management and planning system 62 operate to provide resource management and planning.

Controller 68 controls the operation and administration of elements within resource management and planning system 62. Controller 68 includes any hardware and/or logic elements operable to control and process information. For example, controller 68 may be a microcontroller, processor, programmable logic device, and/or any other suitable processing device. Controller 68 may process information and/or commands received from network interface 70.

Network interface 70 communicates information to and receives information from other elements of manufacturing system 60. For example, network interface 70 may communicate with enterprise elements 64 and affiliated elements 66. In communicating with these elements, network interface 70 may transmit and receive information regarding manufacturing resources and plans, such as information regarding inventories and production capacities.

User interface 72 communicates with a user of resource management and planning system 62. For example, user interface 72 may display information related to production capabilities at particular distributed manufacturing facilities. In addition, user interface 72 may receive input from a user of resource management and planning system 62 regarding the generation of production plans. Thus, user interface 72 represents hardware capable of communicating with a user of resource management and planning system 62 and may include a display, keyboard, mouse, and/or other appropriate devices for inputting and outputting information.

Memory 74 stores, either permanently or temporarily, data and other information, such as information for processing by controller 68 and transmission by network interface 70. Memory 74 represents any one or a combination of volatile or nonvolatile local or remote devices suitable for storing information. For example, memory 74 may include random access memory (RAM), read-only memory (ROM), magnetic storage devices, optical storage devices, or any other suitable information storage device or combination of these devices. Furthermore, memory 74 may store information in one or more modules.

For example, in the embodiment illustrated, memory 74 maintains interactive interface module 76 and planning rules 78. Interactive interface module 76 includes software, executable files, Web pages, and/or appropriate logic modules capable when executed to allow a user to interact with and prepare production plans for manufacturing system 60. For example, interactive interface module 76 may include Web pages capable of receiving information from users regarding proposed sales of products. Interactive interface module 76 may also display information related to processes run by controller 68 to prepare production plans. Planning rules 78 includes rules and other algorithms that affect development of production plans for use by manufacturing system 60. For example, planning rules 78 may include relative weights of cost, quality, and delivery times for use in preparing production plans. Planning rules 78 may be used to automatically generate production plans, to test user generated production plans, and for other appropriate purposes. Furthermore, planning rules 78 may allow for simultaneous analysis using multiple variables.

Collaboration module 80 processes information received from affiliated elements 66 through network interface 70. For example, collaboration module 80 may enable resource management and planning system 62 to associate with affiliated elements 66 to obtain relevant information for storage within memory resident data module 86. Thus, collaboration module 80 may define relationships between otherwise unrelated entities. Furthermore, collaboration module 80 may translate information communicated using different protocols for use by other elements of resource management and planning system 62. Collaboration module 80 may also provide for trading-partner and workflow management. Thus, collaboration module 80 may translate and route messages transmitted between enterprise elements 64 and affiliated elements 66. Thus, collaboration module 80 represents software and/or appropriate hardware for processing information.

IOM module 82 optimizes manufacturing plans using information stored in memory resident data module 86. Changes in circumstances within manufacturing system 60 may cause current plans to be less than optimal. For example, inventory may change due to unexpected or canceled orders, and production capacity may change due to strikes, calamities, or the opening of new factories. These changes may be represented by changes in information stored by memory resident data module 86. IOM module 82 may modify production plans in response to these changes. For example, IOM may resolve delivery plans to ensure efficient delivery between factories, distribution centers, and customers. In some embodiments, IOM module 82 may send optimized assembly instructions, which may include optimized sequencing of assembly, to enterprise elements 64 and affiliated elements 66. Furthermore, IOM module 82 may prioritize components according to various factors such as cost and quality and attempt to fulfill orders according to the prioritized sequence. Thus, IOM module 82 represents software and/or appropriate hardware for optimizing manufacturing plans using information stored in memory resident data module 86.

Global planning engine 84 analyzes information stored by memory resident database 86 and global ERP database 88. For example, global planning engine 84 may select and organize information for use by a user of resource management and planning system 62 using interactive interface module 76. Also, global planning engine 84 may automatically generate production plans based on planning rules 78. In addition, global planning engine 84 may interact with APS modules 90 to facilitate exchange of information between resource management and planning system 62 and enterprise elements 64. Thus, global planning engine 84 represents software and/or appropriate hardware for analyzing information stored by memory resident database 86 and global ERP database 88 and facilitating exchange of information with APS modules 90.

Memory resident data module 86 loads data related to manufacturing resources and plans into memory for manipulation by other elements of resource management and planning system 62. Thus, memory resident data module 86 represents any one or a combination of volatile or appropriate non-volatile local or remote devices suitable for storing information. For example, memory resident data module 86 may include RAM, ROM, magnetic storage devices, optical storage devices, or any other suitable information storage device or combination of these devices. Furthermore, memory resident data module 86 may store information in fields, and each field may be associated with a piece of information stored by enterprise elements 64, affiliated elements 66, and global ERP database 88. In addition, the memory resident data module may be scaled to operate within a fixed memory space to provide for effective transaction processing.

Global ERP database 88 stores, either permanently or temporarily, data related to manufacturing resources and plans. Thus, global ERP database 88 represents any one or a combination of volatile or non-volatile local or remote devices suitable for storing information. For example, memory resident data module 86 may include RAM, ROM, magnetic storage devices, optical storage devices, or any other suitable information storage device or combination of these devices. Furthermore, global ERP database 88 may store information in fields, and each field may be associated with a piece of information stored by enterprise elements 64, affiliated elements 66, and memory resident data module 86.

Information stored in memory resident data module 86 and global ERP database 88 may be obtained from enterprise elements 64 and affiliated elements 66. By interacting with APS modules 90, memory resident data module 86 and global ERP database 88 may facilitate tight integration with elements inside and outside a manufacturing enterprise. For example, using database triggers, changes in information stored by enterprise elements 64 may be quickly recognized and, in response, information stored by memory resident data module 86 and global ERP database 88 may be updated. Furthermore, information obtained by collaboration module 80 from affiliated elements 66 may be communicated to memory resident data module 86 and global ERP database 88 as soon as the information is obtained and/or translated.

Enterprise elements 64 represents a collection of elements that are part of a manufacturing enterprise. As illustrated, enterprise elements 64 includes an enterprise factory 92, an enterprise supplier 96, and an enterprise vender 100. Although a particular number and type of elements have been illustrated, various numbers and types of facilities may be included. Each facility within enterprise elements 64 may be associated with resource management and planning system 62 using an APS module 90.

APS modules 90 facilitate information exchange between enterprise elements 64 and resource management and planning system 62. For example, APS modules 90 communicate information to and from elements within resource management and planning system 62. According to particular embodiments, ASP modules 82 utilize database triggers to communicate changed information quickly from enterprise elements 64 to memory resident data module 86 and/or global ERP database 88.

Individual facilities within enterprise elements 64 may include various components to provide for localized resource management and planning. For example, as illustrated, enterprise factory 92 includes a local ERP module 94, enterprise supplier 96 includes a local PSI module 98, and enterprise vendor 92 includes no localized tool for automated or assisted localized resource management or planning. Local ERP module 94 represents a planning tool used within a local manufacturing facility that plans local production and generates work orders and purchase orders based upon local information. Local PSI module 98 represents a planning tool used within a local manufacturing facility that plans local production and generates work orders and purchase order based upon local information as well as information received from facilities beyond the local facility. Thus, local PSI module 98 may allow work orders and purchase orders to be placed through interaction with resource management and planning system 62. Furthermore, local PSI module 98 may generate local production plans based upon near real-time information.

These localized resource management and planning tools may interact with APS modules 82 to provide for exchange of information with resource management and planning system 62. For example, by tightly integrating APS modules 82 with localized tools, information stored at one of enterprise elements 64 may be automatically shared with memory resident data module 86 and/or global ERP database 88 using APS module 82. Alternatively or in addition, information may be inputted into APS module 82 at the local facility to share information with memory resident data module 86 and/or global ERP database 88. Using similar methods and devices, information may be communicated from memory resident data module 86 and/or global ERP database 88 to the localized resource management and planning tools. However, even in the absence of localized resource management and planning tools, information may be shared between resource management and planning system 62 and enterprise elements 64 using APS modules 82. For example, data at enterprise elements 64 may be manually received and transmitted using APS modules 82.

Affiliated elements 66 represents a collection of elements that are not part of the manufacturing enterprise but that are affiliated with the manufacturing enterprise. As illustrated, affiliated elements 66 includes an affiliated factory 102, an affiliated supplier 106, and an affiliated vendor 108. Although a particular number and type of elements have been illustrated, various numbers and types of facilities may be included. Each facility within affiliated elements 66 may interact with resource management and planning system 62 using collaboration module 80. Thus, as discussed above, collaboration module 80 may enable resource management and planning system 62 to obtain relevant information from affiliated elements 66 by translating information transmitted or coded using different protocols.

Similar to enterprise elements 64 discussed above, individual facilities within affiliated elements 66 may include various components to provide for localized resource management and planning. For example, as illustrated, affiliated factory 102 includes a local ERP module 104, affiliated vendor 108 includes a local ERP module 110, and affiliated supplier 106 includes no localized tool for automated or assisted localized resource management or planning. Local ERP modules 104 and 110 represent planning tools used within local manufacturing facilities to plan local production and generate work orders and purchase orders based upon local information. Information stored by local ERP modules 104 and 110 may be communicated to collaboration module 80. For example, a user may communicate information stored by ERP modules 104 and 110 to collaboration module 80 through network interface 70.

In operation, the elements of resource management and planning system 62 may aggregate, process, and/or disseminate information related to manufacturing system 60. Information may be received through network interface 70 and stored in memory resident data module 86 and/or global ERP database 88. For example, collaboration module 80 may obtain information from affiliated elements 66 and translate the information into a common protocol, and controller 68 may store this information in memory resident data module 86 and/or global ERP database 88. IOM module 82 and/or global planning engine 84 may use the information loaded into memory resident data module 86 to create, modify, and/or optimize production plans.

Enterprise elements 64 may share information with resource management and planning system 62. For example, APS modules 90 may monitor information stored by localized resource management and planning tools and share the information automatically with resource management and planning system 62 using database triggers. However, as discussed above, in the absence of localized resource management and planning tools, information may still be aggregated and communicated to resource management and planning system 62 using APS modules 90. For example, information related to a facility not using a localized resource management and planning tool may be input by an operator into APS module 90c. Once APS module 90c receives information, a database trigger may cause the information to be communicated to resource management and planning system 62. Thus, information may be quickly shared with other elements of manufacturing system 60.

Affiliated elements 66 may also share information with resource management and planning system 62. For example, collaboration module 80 may enable information stored by localized resource management and planning tools to be shared with resource management and planning system 62. However, in the absence of localized resource management and planning tools, information may still be communicated to resource management and planning system 62. For example, information related to a facility not using a localized resource management and planning tool may be communicated by an operator to resource management and planning system 62.

Furthermore, resource management and planning system 62 allows a user to view and act upon information accumulated by resource management and planning system 62 related to production, demand, and inventory of products. For example, information stored in enterprise elements 64 and affiliated elements 66 may be communicated to resource management and planning system 62 through network interface 70 to be stored in global ERP database 88 and/or loaded into memory resident data module 86. Using interactive interface module 76, planning rules 78, and global planning engine 84, a user may prepare production plans and disseminate those plans within manufacturing system 60 based upon the information. Alternatively or in addition, global planning engine 84 may automatically prepare production plans. According to particular embodiments, controller 68 may load and analyze information using global planning engine 84 and memory resident data module 86 at any time rather than only performing batch processing. Furthermore, global planning engine 84 may consider multiple constraints simultaneously when generating production plans.

Optimization of existing production plans may also be performed. IOM module 82 may receive feedback from affiliated elements 64 and reanalyze production plans based on the feedback. According to particular embodiments, IOM module 82 detects changes in information stored by memory resident data module 86 and analyzes possible changes to production plans regarding assembly and delivery of products based on the detected changes.

Thus, elements of manufacturing system 60 may operate to manage manufacturing resources and plan manufacturing activities. Elements of manufacturing system 60 may cooperate to provide access to near real-time information related to resources and capabilities of manufacturing system 60. Furthermore, the real-time information may be used by elements of resource management and planning system 62 to plan and optimize production within manufacturing system 60.

Note that manufacturing system 60 illustrates one arrangement of elements for managing manufacturing resources and planning manufacturing activities. Other arrangements may be appropriate. Furthermore, in some embodiments, elements such as local ERP module 94, resource management and planning system 62, and IOM module 82 may be created using an object-oriented program language such as Java. Thus, a series of Java classes may be created and combined into a single resource management and planning engine, where particular classes may be switched on or off as appropriate. Furthermore, aspects of resource management and planning system 62 may be centralized on one computer or elements of resource management and planning system 62 may be distributed among multiple computers.

Figure 3:
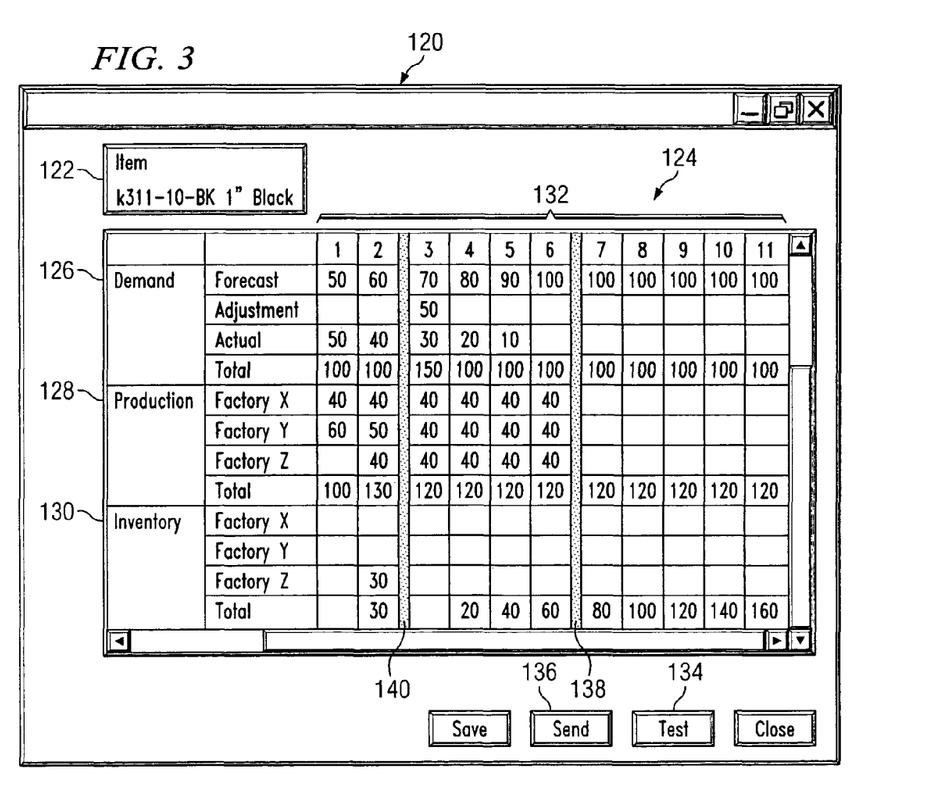
FIG. 3 illustrates a graphical user interface for interacting with management and planning tools.

FIG. 3 illustrates interactive window 120, which may be used to manage manufacturing resources and plan manufacturing activity. According to particular embodiments, interactive window 120 allows a user, such as a salesman, to interact with resource management and planning system 62. Furthermore, interactive window 120 may display information related to elements of manufacturing systems 10 and 60 and allow generation and modification of production plans.

Title 122 indicates a product associated with displayed information. As illustrated, title 122 may indicate a part number and/or a part description. In particular embodiments, title 122 may indicate an individual product or a combination of products, such as an assembly of products.

Chart 124 displays information related to the product identified in title 122. Chart 124 includes a demand section 126, a production section 128, and an inventory section 130. Demand section 126 shows demand information for the product identified in title 122. Production section 128 indicates production information associated with the product. Inventory section 130 shows inventory information associated with the product. Information related to each section is organized into multiple time periods 132. Time periods 132 may be any appropriate time periods such as days, weeks, or months. Thus, chart 124 may show historical data as well as estimations, plans, or predictions of future data by time period.

Each section may be subdivided. For example, demand section 126, as illustrated, is divided into subsections indicating forecast information, adjustment information, actual information, and total information. Forecast information represents estimates or predictions of future orders for the product indicated in title 122. Forecast information may be generated in at least three ways. First, forecast information may be generated by analyzing historical data and using one or more algorithms to predict future orders based on the historical data. Second, forecast information may be received from customers. For example, customers may periodically communicate forecasts of orders. Third, forecast information may be entered manually. Thus, forecast information may reflect a subjective prediction of future orders by a user of interactive window 120. While one of these or other techniques may be used to generate forecast information, alternatively or in addition, these and other techniques may be combined to generate forecast information. Adjustment information represents modifications to the forecast information. Adjustments may be made for various reasons. For example, if forecast information is generated using an algorithm but a user anticipates a different number of orders in the future, the user may enter an adjustment in the adjustment information. Actual information represents actual, received orders for the product.

As illustrated, production section 128 and inventory section 130 are divided into subsections according to three factories. However, note that production and inventory information may not be divided into categories or may be divided into any other appropriate subcategories, such as components of the product identified in title 122. In addition, as discussed above, information related to demand, production, and inventory may be tightly or loosely coupled to elements with a manufacturing system. For example, according to one embodiment chart 124 may display up-to-date information received from memory resident data module 86.

In addition, chart 124 may group time periods into at least three planning stages by fences 138 and 140. A first planning stage may require that demand and actual sales information be recorded but not allocated to particular manufacturing facilities. Thus, for example, demand information in time periods to the right of fence 138 may be unallocated. That is, production plans may not yet be generated for forecasted and/or actual sales some time in the relatively distant future. A second planning stage, closer in time to the present time than the third planning stage, may require that demand be allocated to particular facilities. For example, demand information in time periods between fence 138 and fence 140 may be allocated to particular factories. Total demand may be used to allocate production to particular factories. Alternatively, one or a combination of forecast, adjustment, and actual sales information may be used to allocate production to particular factories. Thus, production plans may be generated when a time period moves from the right to the left of fence 138. While time periods remain between fence 138 and fence 140, production plans related to these time periods may be modified and/or optimized due to various changes, such as changes in inventory, production capacity, newly placed orders. A third planning stage, closer in time to the present time than the second planning stage, may require that demand be allocated to particular facilities and that production plans remain unchanged until executed. Thus, for example, demand information in time periods to the left of fence 140 may be allocated to particular factories, without opportunity for change. Forecast information may be ignoring during this stage. Production plans may be made permanent or fixed when a time period moves from the right to the left of fence 140.

In operation, a user may use interactive window 120 to view and manipulate information related to manufacturing systems. Furthermore, a user may use interactive window 120 to generate and/or modify production plans for products to be manufactured. According to a particular embodiment, a user may input demand information and/or a production plan by modifying chart 124. After inputting information and/or a production plan, the user may select test button 134. After a user selects test button 134, a processor may manipulate information in chart 124 to generate or test a user-generated production plan according to stored rules and algorithms. Thus, a user may also be able to automatically generate production plans and/or manually generate production plans using chart 124. Test button 134 may also cause a placeholder to be stored in memory resident data module 86 and/or in local facilities within manufacturing system 60. After reviewing a production plan and making any changes, if allowed, the user or supervisor may use send button 136 to communicate an approved production plan indicated in chart 124 to appropriate elements of a manufacturing enterprise and/or elements. For example, information received from a local factory may be used to generate a global production plan, and information related to the global production plan may be communicated back to the local factory. Thus, placeholders stored in memory resident data module 86 and/or in local facilities may be converted to actual orders upon selection of send button 136.

Various rules may be utilized by interactive window 120. For example, rules may be used with a goal toward equalizing supply and demand within each time period to minimize or hold constant inventory. On the other hand, for products with distinct high demand periods, such as back-to-school products, rules may be used to build inventory over time periods just prior to the high demand periods.

Interactive window 120 may be utilized by various users, such as salesmen, supervisors, and corporate representatives. To provide for appropriate use of interactive window 120, lengths of time used for fences 138 and 140 may be adjusted according to the identity of the user. For example, shorter lengths of time may be more appropriate for salesmen when compared with corporate representatives. A salesman may desire to compare demand and production in the near future to make a short term decisions such as whether to make a particular sale to a particular customer. Corporate representatives, on the other hand, may desire to compare demand and production in the distant future to make long term decisions such as whether to build new factories. Thus, various levels of planning may be provided by interactive window 120, including short term tactical and strategic planning as well as long term corporate planning.

Furthermore, particular users may have limited use of the features of interactive window 120. For example, one user may be limited to inputting information and running tests of production plans, while another user may be allowed to approve the production plan and send the production plan to system facilities. According to some embodiments, access to interactive window 120 may be governed by identifications and passwords, which may be used to control access to particular features.

Note that as illustrated interactive window 120 includes specific features. However, note that interactive window 120 may include more or less features. For example, an insist button may added to allow a user to negotiate use of a production plan that may violate rules used by interactive window 120. Using the insist button, a user may indicate the desire to use a particular production plan and begin the process of negotiating with an appropriate person to use the desired production plan. For instance, a salesman may want to make a particular sale to begin a relationship with a lucrative customer, but interactive window 120 may indicate that no production plan is possible under the rules governing interactive window 120 due to lack of production capacity. By operating the insist button, the salesman may insist on a production plan that will make the sale possible, and an email may be sent to a factory supervisor to request extra shifts at a factory to make the sale possible.

While a single interactive window 120 has been illustrated for simplicity in explanation, note that multiple interactive windows 120 may be utilized. For example, headquarters 12 and/or sales offices 14 may utilize the resource management and planning tools provided by interactive window 120 to respond to customers' requests for manufacture and/or delivery of products. Thus, interactive window 120 may allow for a salesman to make informed, efficient, and realistic choices based on possible production plans when making a sale.

Figure 4:
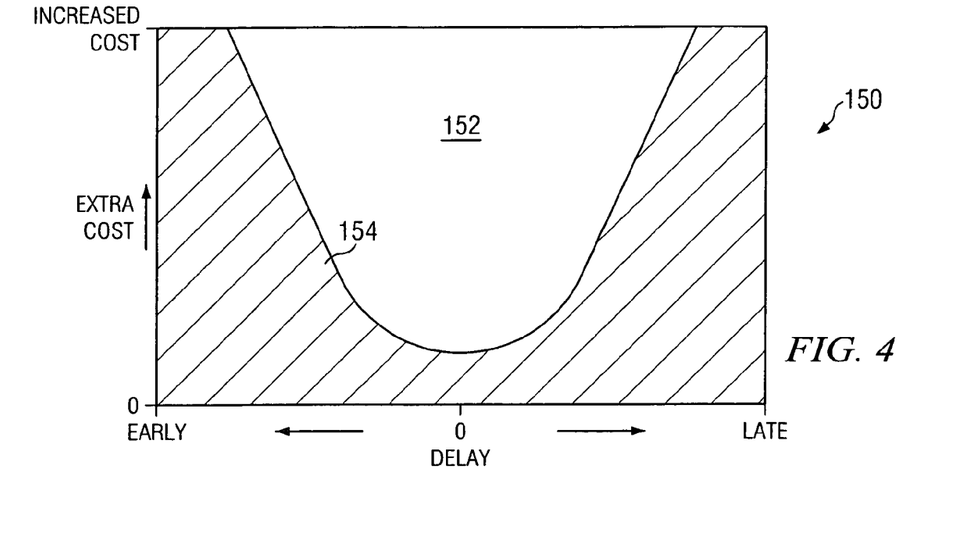
FIG. 4 is a chart illustrating a method of determining when to review automated planning decisions.

FIG. 4 illustrates a review decision diagram 150 that may be used to determine when to seek review of user generated and/or automatically generated production plans. Review decision diagram 150 graphs possible combinations of "extra cost" and "delay" to create a matrix for use in making determinations when to seek confirmation of a production plan.

The vertical axis of review decision diagram 150 represents extra cost, which may be measured using units of money, and the horizontal axis represents delay, which may be measured using days, weeks, months, or other periods of time. Extra cost represents cost associated with adopting a manufacturing plan that is more expensive than a least expensive manufacturing plan. Delay represents times associated with adopting a manufacturing plan that will cause a product to be produced and/or delivered earlier or later than a shortest manufacturing plan or earlier or later than a desired production or delivery date.

Review decision diagram 150 includes two sections: a non-review section 152 and a review section 154. Non-review section 152 represents combinations of extra cost and delay that will not generate review of a proposed production plan. Review section 154 represents combinations of extra cost and delay that will cause review of the proposed production plan. Furthermore, review decision diagram 150 may be personalized according to subjective views of extra cost and delay by customers, manufacturing facilities, or other appropriate entities. Note that as illustrated non-review section 152 and review section 154 are separated by a parabolic line. However, various shapes may be used. For example, various other curved and straight lines may be used to separate one or more non-review sections 152 from one or more review sections 154.

Review decision diagram 150 may be used, for example, by global planning engine 84 and/or IOM module 82. The need for review may be determined in part by comparing a planned date of delivery with a promised date of delivery. When a deviation between a planned date and a promised date and extra cost combines to place a data point in review section 154 of review decision diagram 150, review may be suggested and a firm date may not be set until approval is received.

Thus, review decision diagram 150 may be used to plot a production plan in terms of scheduling and cost to determine whether to trigger review of the production plan. Review decision diagram 150 operates to constrain automated substitutions of components and other changes to production and delivery plans based on predefined tolerances. Of course, review decision diagram 150 may be utilized by any appropriate element of manufacturing system 60 for use with any appropriate decision.

Figure 5:
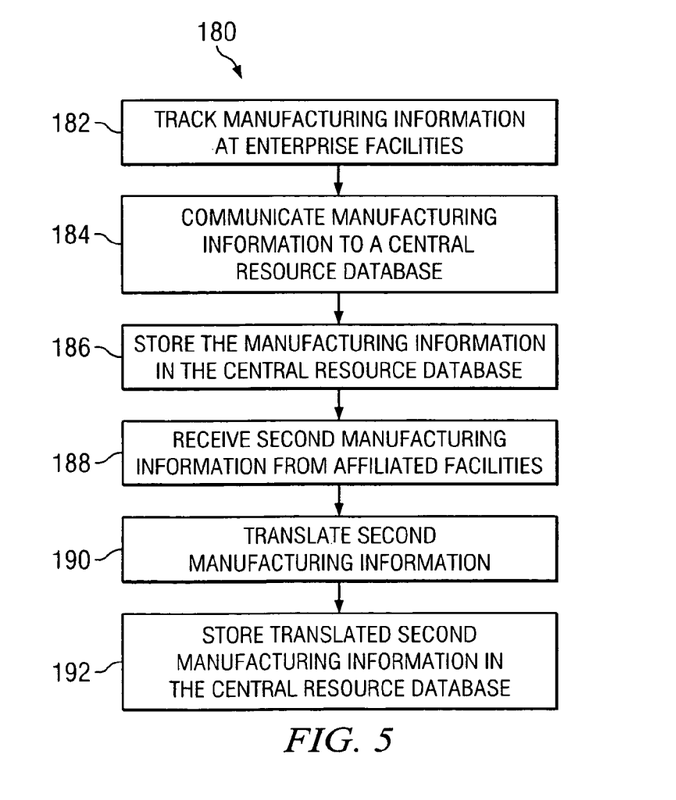
FIG. 5 is a flowchart illustrating a method for sharing manufacturing information.

FIG. 5 is a flowchart illustrating a method 180 for sharing manufacturing information. APS modules 90 track manufacturing information at enterprise facilities at step 182. The manufacturing information may include any information relating to manufacturing, such as inventory and production, stored at enterprise facilities such as enterprise elements 64. The information may be tracked in various ways. For example, APS module 90a may monitor information stored in local ERP module 94, APS module 90b may monitor information stored in local PSI module 98, and APS module 90c may determine if a user inputs information into APS module 90c.

APS modules 90 communicate the manufacturing information to a central resource database at step 184. The manufacturing information may be communicated in response to a request received from, for example, global planning engine 84. Alternatively or in addition, the manufacturing information may be communicated periodically or in response to changes in the manufacturing information detected by APS modules 90. According to particular embodiments, APS modules 90 utilize database triggers to detect and communicate changes in the manufacturing information to global ERP database 88 and/or memory resident data module 86. At step 186, the manufacturing information communicated to the central resource database is stored. Thus, according to particular embodiments, the central resource database may be global ERP database 88.

Collaboration module 80 receives second manufacturing information from affiliated facilities at step 188. The second manufacturing information may include any information relating to manufacturing, such as inventory and production, communicated by affiliated facilities such as affiliated elements 66. For example, local ERP modules 104 and 106 as well as an administrator at affiliated supplier 106 may communicate the second manufacturing information to collaboration module 80.

At step 190, collaboration module 80 translates the second manufacturing information. Translation may be useful if affiliated facilities fail to utilize a common protocol. For example, various affiliated elements may communicate the second manufacturing information to collaboration module 80 using different protocols. Collaboration module 80 may interpret each communication and translate the communication as appropriate. At step 192, the translated second manufacturing information is stored in the central resource database.

Thus, method 180 illustrates one manner of accumulating and storing relevant information from various manufacturing facilities. The information may be utilized by elements of manufacturing systems 10 and 60 as appropriate to generate, regenerate, test, and optimize production plans.

Figure 6:
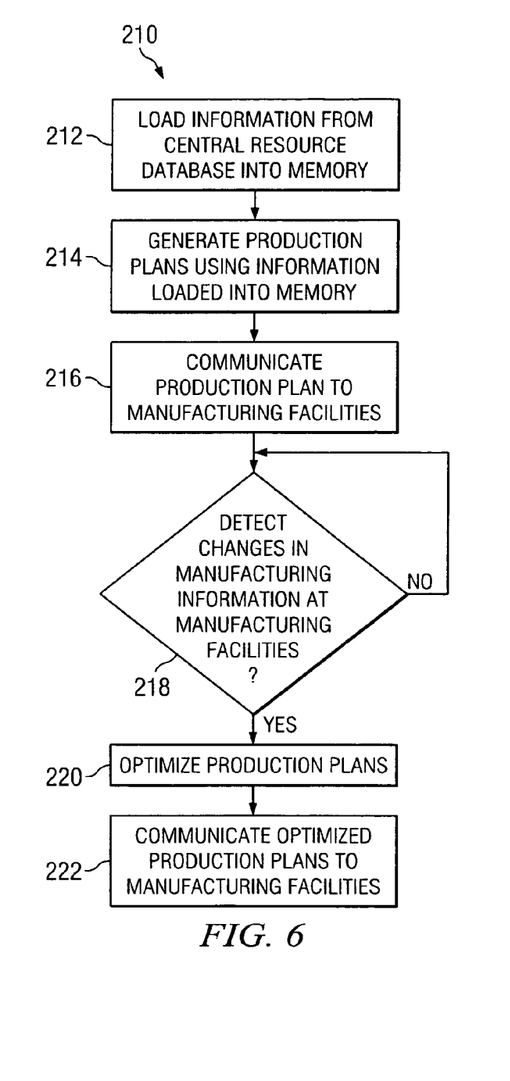
FIG. 6 is a flowchart illustrating a method for planning manufacturing activities.

FIG. 6 is a flowchart illustrating a method 210 for planning manufacturing activities. Information from a central resource database is loaded into memory at step 212. The information may include any appropriate information related to manufacturing activities. For example, memory resident data module 86 may obtain manufacturing information stored in global ERP database 88 and load the information into memory. The information may be loaded into memory at any appropriate time. For example, memory resident data module 86 may load the information in response to database triggers. Memory resident data module 86 may alternatively or in addition load the information in preparation for analysis of the information by global planning engine 84. By loading the data into memory when appropriate, memory resident data module 86 may provide for efficient and timely analysis of the information. Furthermore, according to particular embodiments, the memory space is scaled to provide for robust data manipulation.

Global planning engine 84 generates production plans using the information loaded into memory at step 214. The production plans may relate to any aspect of manufacturing products. For example, the production plans may provide details regarding shipment of components to a particular production plant for assembly of a product. As another example, the production plans may relate to schedules for production of components using raw materials at a multiple production facilities. Thus, the production plans are communicated to the appropriate manufacturing facilities at step 216.

Changes are detected in manufacturing information at manufacturing facilities at step 218. Various elements of manufacturing systems 10 and 60 may detect the changes. For example, APS modules 90 may detect changes in manufacturing information at enterprise elements 64 and communicate the information to resource management and planning system 62 using database triggers. Alternatively or in addition, collaboration module 80 may detect changes in information communicated by affiliated elements 66. Also, IOM module 82 may receive feedback from manufacturing facilities and determine that changes have occurred in manufacturing information.

At step 220, IOM module 82 optimizes production plans based on the changed manufacturing information. IOM module 82 may analyze manufacturing information loaded into memory using memory resident data module 86. According to particular embodiments, IOM module 82 analyzes production plans for a particular fixed time period in the future. Production plans in the fixed time period may be modified, for example, to provide for more efficient uses of resources. IOM module 82 may communicate the optimized production plans to the manufacturing facilities at step 222. For example, IOM module 82 may communicate modified production plans to affiliated elements 66 using collaboration module 80. IOM module 82 may communicate modified production plans to enterprise elements 64 using APS modules 90.

Thus, method 210 illustrates one example of utilizing manufacturing information to generate and optimize production plans. Furthermore, method 210 shows loading relevant information into a fixed memory space to provide for efficient and robust analysis of manufacturing information.

Figure 7:
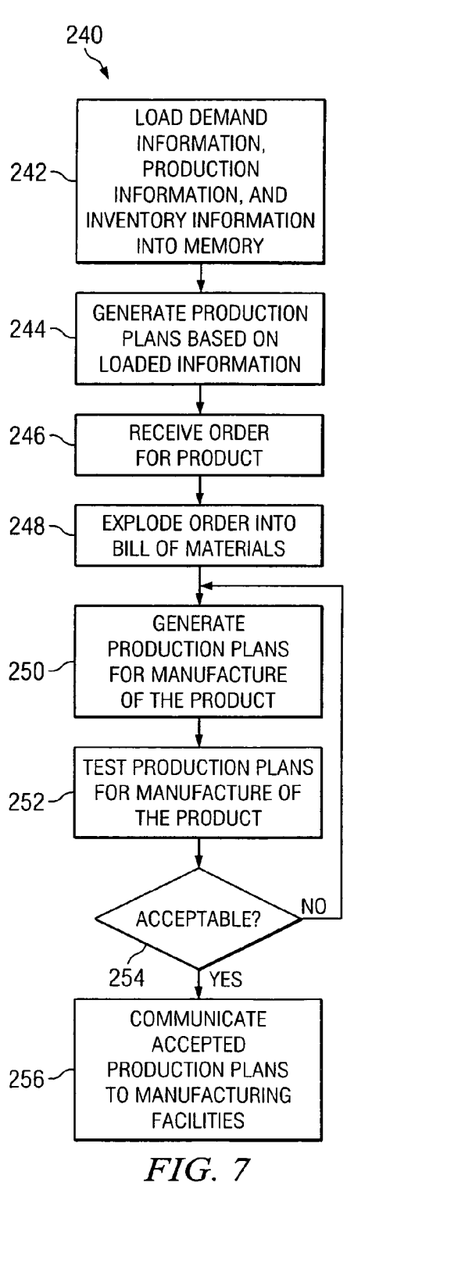
FIG. 7 is a flowchart illustrating another method for planning manufacturing activities.

FIG. 7 is a flowchart illustrating a method 240 for planning manufacturing activities. Memory resident data module 86 loads into memory demand information, production information, and inventory information at step 242. The information may be near real-time information stored in memory resident data module 86.

The demand information includes any information related to demand for manufacture of a product. For example, demand information may include information related to actual and forecasted sales. Forecasted sales may be generated in various ways. According to some embodiments, forecast information may be generated based on algorithms that analyze past orders of products to determine trends, based on indications from customers, and/or based on projections by other individuals. Demand information may also include adjustments. As discussed above, adjustments may be entered manually to plan for production that differs from that predicted by the forecast and actual sales information or for any other appropriate reason. The production information relates to scheduled production and/or production capabilities at enterprise elements 64 and/or affiliated elements 66. According to particular embodiments, production information may be communicated to resource management and planning system 62 using APS modules 90 and/or collaboration module 80. The inventory information identifies actual or projected inventories of goods and materials at enterprise elements 64 and/or affiliated elements 66. According to particular embodiments, inventory information may be communicated to resource management and planning system 62 using APS modules 90 and/or collaboration module 80.

Global planning engine 84 generates production plans using the loaded information at step 244. As discussed above, the production plans may relate to any aspect of manufacturing products and the production plans may be communicated to manufacturing facilities as appropriate. The production plans may be automatically generated and/or created by a user of interactive window 120.

An order for production of a product is received at step 246. For example, an order may be communicated by customer 22 through network 24 to sales office 14. The order may be placed in various ways, such as via telephone or using an extensible markup language (XML) document. The order is exploded or broken down to generate a bill of materials at step 248. The bill of materials indicates resources that may be used to manufacture and deliver the product to the customer. For example, the bill of materials may indicate raw materials and components that may be used to produce the desired product.

Global planning engine 84 generates production plans for manufacture of the product at step 250. The production plans are generated in light of the information loaded into memory at step 242 as well as the other production plans generated at step 244. Again, as discussed above, the production plans relate to any aspect of manufacturing the product. Also, the production plans may be automatically generated and/or created by a user of interactive window 120. Specifically, the production plans schedule appropriate actions to accomplish each task and to produce each element indicated in the bill of materials.

Global planning engine 84 tests the production plans at step 252. Testing the production plans may include analysis of automatically generated or user-created production plans. For example, testing production plans may involve analyzing delay and cost associated with the production plans using review decision diagram 150. A production plan causing a particular combination of extra cost and/or delay may generate review of the production plan. Review may involve approval or disapproval of the production plan by a user or a supervisor.

Note that generating and testing the production plans may involve use of planning rules 78. Furthermore, during generation and/or testing of production plans placeholder plans may be stored in memory resident data module 86 and/or communicated to enterprise elements 64 and/or affiliated elements 66. The placeholder plans may reserve resources pending finalization and acceptance of production plans.

At step 254, a decision is made whether the production plans for manufacture of the product are acceptable. Acceptability may be automatically determined by global planning engine 84. For example, the results of the test may indicate whether the production plans are acceptable. Alternatively or in addition, acceptability may be manually determined by a user of resource management and planning system 62 or a supervisor of the user.

If the production plan is not acceptable, method 240 returns to step 250 to re-plan the production. Once a production plan is found to be acceptable, global planning engine 84 communicates the accepted production plans to the manufacturing facilities at step 256. For example, the production plans may be communicated from resource management and planning system 62 to enterprise elements 64 and affiliated elements 66. When placeholder plans are utilized, placeholder plans may be converted to actual production plans at this or at any other appropriate time.

Thus, method 240 provides for the generation and testing of production plans for use by elements of manufacturing systems 10 and 60. An order for a product may be received and production plans may be generated to cause manufacture of an ordered product.

The preceding flowcharts illustrate particular methods used to manage manufacturing resources and plan manufacturing activities. However, these flowcharts illustrate only exemplary methods of operation, and the present invention contemplates any suitable techniques, elements, and applications for performing these functions. Thus, many of the steps in the flowcharts may take place simultaneously and/or in different orders than as shown. In addition, methods may include additional steps or fewer steps, so long as the methods remain appropriate. Moreover, one or more elements of manufacturing system 10 and/or manufacturing system 60 may work independent and/or in conjunction with other elements to manage manufacturing resources and plan manufacturing activities.

Although the present invention has been described in several embodiments, a myriad of changes or modifications may be suggested to one skilled in the art, and it is intended that the present invention encompass such changes and modifications as fall within the present appended claims.

What is claimed is:

1. A resource management and planning system comprising:
   one or more processors; and
   one or more tangible memory devices comprising one or more programs of instructions, the one or more programs of instructions comprising:
   a plurality of advanced planning and scheduling modules operable to track manufacturing information at a plurality of distributed enterprise facilities and to communicate the manufacturing information to a global planning engine;
   the global planning engine operable to receive the manufacturing information, to generate manufacturing plans based at least in part on the manufacturing information, and to communicate the manufacturing plans to the advanced planning and scheduling modules; and
   an intelligent order management module operable to receive feedback regarding execution of the manufacturing plans from the advanced planning and scheduling modules, to identify one of the manufacturing plans describing manufacturing activities planned to occur within a fixed time period in the future, to modify the identified manufacturing plan based on the feedback, and to communicate the modified manufacturing plan to the advanced planning and scheduling modules.

2. The resource management and planning system of claim 1, wherein the advanced planning and scheduling modules are further operable to detect changes in the manufacturing information and to communicate the changes to the intelligent order management module in the feedback.

3. The resource management and planning system of claim 1, wherein the modification to the identified manufacturing plan affects assembly of a product manufactured by the distributed enterprise facilities.

4. The resource management and planning system of claim 1, the one or more programs of instructions further comprising:
   a global enterprise resource database operable to store the manufacturing information and to update the stored manufacturing information based on the feedback; and
   a memory resident data module operable to load the manufacturing information into memory, to interact with the global planning engine to process the manufacturing information loaded into memory to produce the manufacturing plans, and to interact with the intelligent order management module to process the manufacturing information loaded into memory to produce the modified manufacturing plan.

5. The resource management and planning system of claim 4, the one or more programs of instructions further comprising:
   a collaboration module operable to interact with a plurality of affiliated facilities to facilitate transfer of second manufacturing information from the affiliated facilities to the global enterprise resource database.

6. The resource management and planning system of claim 1, the one or more programs of instructions further comprising:
   a plurality of local enterprise resource planning systems located at the distributed enterprise facilities and operable to store the manufacturing information at the distributed enterprise facilities;
   wherein the advanced planning and scheduling modules are further operable to interact with the local enterprise resource planning systems to detect changes in the manufacturing information and to communicate the changes to the intelligent order management module.

7. The resource management and planning system of claim 1, the one or more programs of instructions further comprising:
   a plurality of local production, sales, and inventory modules located at the distributed enterprise facilities and operable to store the manufacturing information at the distributed enterprise facilities and to generate local production plans based on the manufacturing information at the distributed enterprise facilities;
   wherein the advanced planning and scheduling modules are further operable to interact with the local production, sales, and inventory modules to detect changes in the manufacturing information and to communicate the changes to the intelligent order management module.

8. The resource management and planning system of claim 1, wherein the advanced planning and scheduling modules are further operable to receive input of the manufacturing information from users at the distributed enterprise facilities and to communicate messages including the inputted manufacturing information to the global planning engine.

9. The resource management and planning system of claim 1, wherein the intelligent order management module is further operable to identify changes in the manufacturing information using the feedback and to modify plans for shipping of products from the distributed enterprise facilities based on the identified changes.

10. The resource management and planning system of claim 1, wherein the manufacturing information comprises near real-time information indicating allocations of resources at the distributed enterprise facilities.

* * * * *